US008620215B2

(12) United States Patent
Abel et al.

(10) Patent No.: US 8,620,215 B2
(45) Date of Patent: Dec. 31, 2013

(54) PERSONALIZATION OF A MOBILE COMMUNCATION DEVICE

(75) Inventors: Miller Thomas Abel, Mercer Island, WA (US); Shai Guday, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 261 days.

(21) Appl. No.: 12/851,126

(22) Filed: Aug. 5, 2010

(65) Prior Publication Data
US 2012/0035989 A1    Feb. 9, 2012

(51) Int. Cl.
*H04B 7/00*    (2006.01)
(52) U.S. Cl.
USPC .......... 455/41.2; 455/575.8; 455/575.1; 455/566; 455/558; 235/382; 709/227
(58) Field of Classification Search
USPC .......................................... 455/41.2
See application file for complete search history.

(56) References Cited

U.S. PATENT DOCUMENTS

| | | | |
|---|---|---|---|
| 7,366,551 B1 * | 4/2008 | Hartley ................... | 455/575.1 |
| 2003/0186729 A1 | 10/2003 | Engstrom et al. | |
| 2004/0018863 A1 * | 1/2004 | Engstrom et al. ......... | 455/575.8 |
| 2005/0085272 A1 * | 4/2005 | Anderson et al. ........... | 455/566 |
| 2006/0084394 A1 | 4/2006 | Engstrom et al. | |
| 2006/0172765 A1 | 8/2006 | Lev | |
| 2007/0239981 A1 | 10/2007 | Lessing | |
| 2008/0014966 A1 | 1/2008 | Chakraborty et al. | |
| 2008/0046570 A1 * | 2/2008 | Abel ........................ | 709/227 |
| 2008/0133569 A1 | 6/2008 | Vu et al. | |
| 2008/0155257 A1 | 6/2008 | Werner et al. | |
| 2009/0069050 A1 * | 3/2009 | Jain et al. ................. | 455/558 |
| 2009/0075592 A1 | 3/2009 | Nystrom et al. | |
| 2009/0144435 A1 | 6/2009 | Naniyat | |
| 2010/0065630 A1 * | 3/2010 | Spencer, II ............... | 235/382 |

FOREIGN PATENT DOCUMENTS

WO    2009001259 A2    12/2008

OTHER PUBLICATIONS

Zafra, Arnold., "Nokia unveils 6212 NFC-enabled classic phone", Retrieved at << http://www.cellphonenews.com/?p=1744 >>, Apr. 16, 2008, pp. 4.
"White Paper Near Field Communication", Retrieved at << http://www.nokia.com/NOKIA_COM_1/Press/Materials/White_Papers/pdf_files/White%20paper_Nokia_Near%20field%20communication.pdf >>, 2007, pp. 1-8.
"Using the right NFC tag type for the right NFC application", Retrieved at << http://rfid.net/basics/near-field-communication-nfc/197-near-field-communication-part-2 >>, Retrieved Date: Apr. 27, 2010, pp. 5.

* cited by examiner

*Primary Examiner* — Fayyaz Alam
*Assistant Examiner* — Mohammed Rachedine
(74) *Attorney, Agent, or Firm* — Mayer & Williams, PC (57) ABSTRACT

An accessory for personalizing a mobile communication device includes an accessory body that is configured to adorn the mobile communication device and at least partially cover its exterior. At least one graphic design is disposed on the exterior surface of the accessory body to convey a theme. A data tag is secured to the accessory. The data tag stores data that facilitates personalization of at least one functionality of the mobile communication device in support of the theme. The data tag being configured so that the data is accessible via a short-range wireless protocol such as the Near-Field Communication (NFC) protocol.

20 Claims, 5 Drawing Sheets

PERSONALIZATION OF A MOBILE COMMUNCATION DEVICE

BACKGROUND

With the proliferation of electronic devices, especially mobile electronic devices, such as, mobile phones, hand-held personal computers (PC), and so forth, these devices have gained the status of personal appliances to a person. As a result, increasingly, users desire to personalize these devices. For example, in addition to a wide variety of body casing colors, interchangeable faceplates of various colors and artistic designs are available for a variety of mobile phones to allow the users to have even greater choices providing different physical appearances to their own devices. Additionally, a variety of non-standard screen-savers and ring tones can be downloaded into the devices to further personalize the devices. Similarly, hand-held personal computers and personal digital assistants also come in various colors, with various screen savers and wallpapers.

These approaches to personalization suffer from a number of disadvantages. First, they are disjoint. Typically, a user may go to a mall or an online e-commerce site to shop and purchase, e.g. a faceplate with design and/or color that is of interest to the user. Then, the user may go online to web sites to search and look for a custom ring tone or a screen saver of interest to the user. It is the user's responsibility to choose and combine the appropriate hardware, i.e. faceplate design/color, with the software behavior, i.e. custom ring tone etc. to create a total personality. The process is cumbersome for many users, especially for the more novice users, as the proliferation of mobile electronic devices reaches more and more users. Moreover, the approaches do not facilitate quick and timely changes to the personality to be taken on by the mobile electronic devices. These shortcomings apply equally to personalization of other electronic devices, such as game consoles.

SUMMARY

In one implementation, a casing, faceplate, sleeve, covering or other accessory for a mobile electronic device such as a mobile phone or other communication device includes designs (typically thematic) depicted on one or more of its exterior surfaces. In this way the user can personalize the physical appearance of the phone. The accessory also includes a data tag which stores complementary instructions and/or data that is complementary to the theme. The instructions and/or data allow the mobile electronic device to be personalized behaviorally as well as physically.

In some implementations the data tag is configured to communicate over a short-range interface. One illustrative protocol that may be employed in support of the short-range interface is the Near-Field Communication (NFC) protocol. In this case the mobile electronic device includes an NFC reader to read the data stored on the data tag. Because of its short range, the mobile electronic device may only be able to access the data while the accessory adorns it.

In one implementation the data stored on the data tag includes a resource specification such as URL that specifies the location from which content used to behaviorally personalize the mobile electronic device may be obtained. Illustrative content that may be obtained include ring tones, wallpaper, applications and screensavers, as well as video and audio clips or other material.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

For ease of understanding, the methods, devices and techniques described herein will be primarily described in the context of wireless mobile phones that can be accessorized with a faceplate, sleeve, cover, jacket or the like. In this context is should be noted that the accessory is not necessary to the normal operation of the mobile phone, but rather it may be eliminated or replaced with another accessory as the user desires. Thus, the accessory is not an element of the housing or any other component of the mobile phone itself.

More generally, however, the methods, devices and techniques described herein are applicable to mobile communication devices that include but are not limited to the illustrative wireless mobile phone. For example, other such mobile communication devices include, without limitation, conventional cellular telephones, PCS handset devices, personal digital assistants, portable media players and portable computers (e.g., notebooks and netbooks) and game consoles. Accordingly, references to wireless mobile phones in the description to follow are merely illustrative. Likewise, the accessory is not limited to the illustrative cover that is depicted below, but more generally includes any accessory that may be attached or otherwise physically associated with the mobile communication device. In this regard such accessories may include promotional materials such as stickers and the like.

Figure 1:
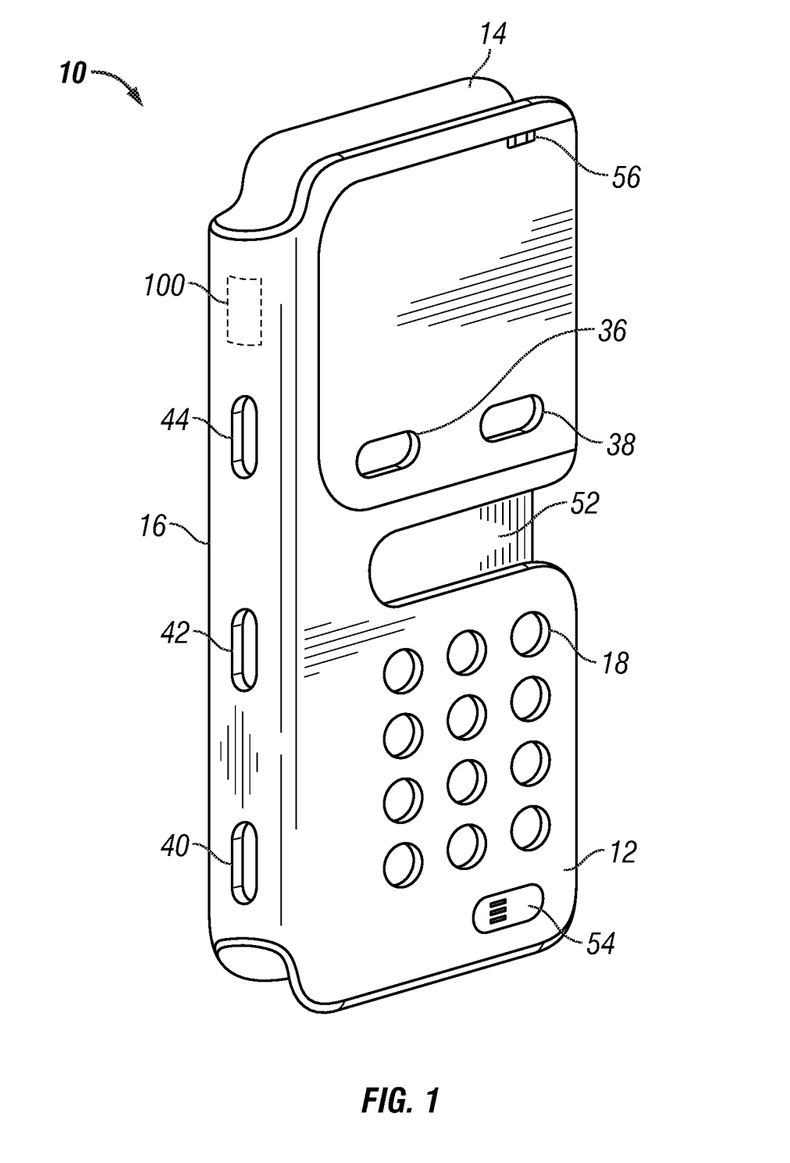
FIG. 1 shows one example of a cover that serves as an accessory for a mobile phone.

FIG. 1 shows one example of a cover 10 that serves as an accessory for a mobile phone. The cover is designed to enable a complementarily shaped and dimensioned mobile phone to be personalized in an improved and more user friendly manner.

As will be described in more detail below, in various implementations the cover 10 may include physical designs (typically thematic) depicted on its exterior surfaces, and complementary instructions and/or data disposed in a data tag, to enable a mobile phone to be personalized physically as well as behaviorally.

In this example cover 10 comprises a resilient semi-rigid shell having a front face 12 and a back face 14 commonly connected to a side portion 16. As illustrated, cover 10 has a substantially "U"-shaped profile. This configuration is adapted to enable the cover 10 to clasp around a complementary mobile phone, which in one implementation, has a substantially trapezoidal profile. Of course, in other examples the cover 10 may be flexible or even completely rigid.

Figure 2:
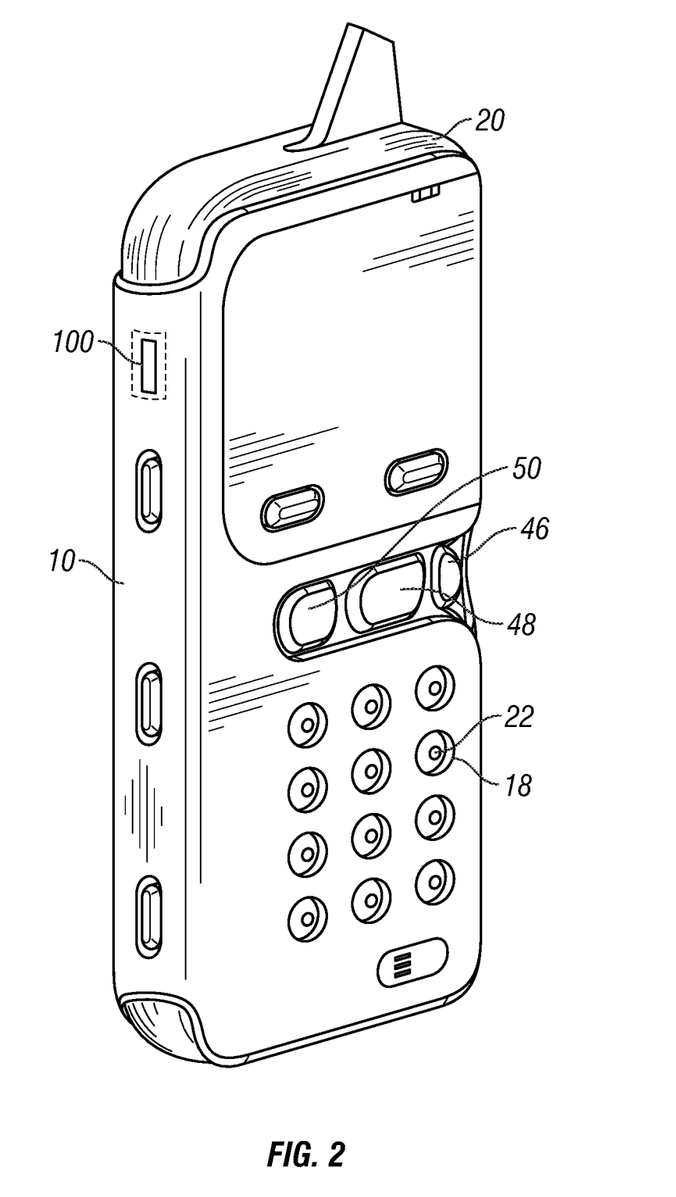
FIG. 2 shows an example of a mobile phone that may be adorned by the cover shown in FIG. 1.
Figure 3:
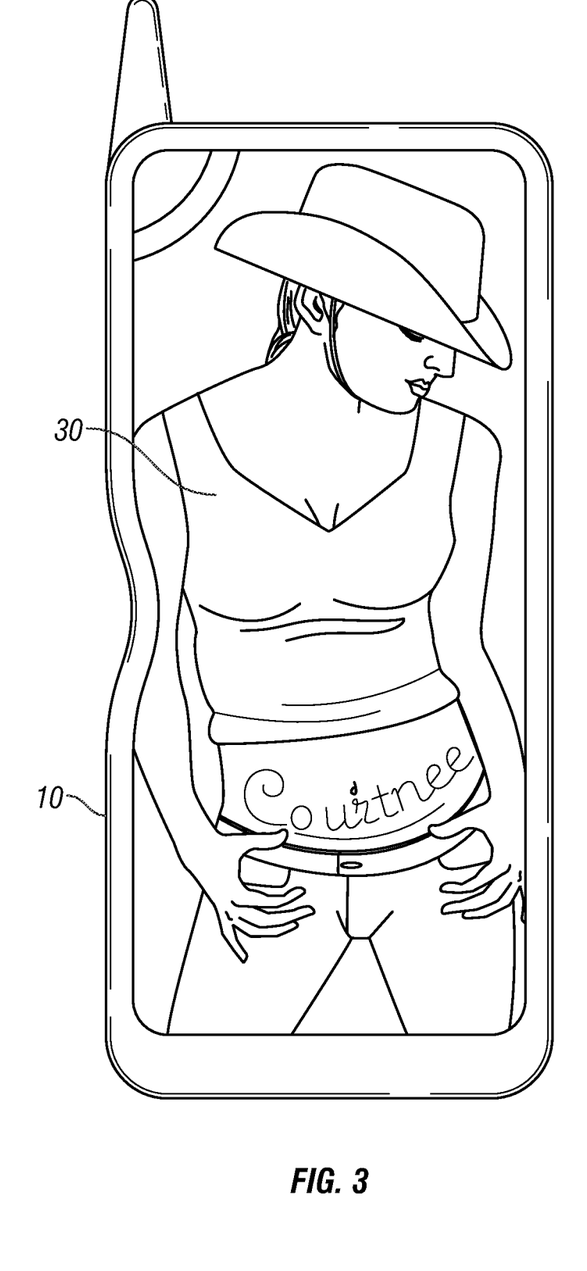
FIG. 3 shows one example of mobile communication device that is configured as a mobile phone.

As shown, cover 10 includes a plurality of openings 18 through which respective keypad buttons on a target mobile phone may pass, upon adornment of the cover by the mobile phone. For example, a configuration where the cover 10 is adorned by a mobile phone 20 including a plurality of keypad buttons 22 is shown in FIG. 2. Openings 18 enable a user to activate keypad buttons 22 on the mobile phone 20, even after mobile phone 20 has adorned cover 10. In some configurations, the mobile phone adorning the cover may include various input buttons in addition to keypad buttons. Accordingly, in this example cover 10 further includes slots 36 and 38 defined in front face 12, and slots 40, 42 and 44 defined in side portion 16, to match corresponding buttons on mobile phone 20.

Mobile phone 20 also may include additional buttons, including buttons 46, 48 and 50, disposed at a mid-portion of its front surface. In order to accommodate access to these buttons, the cover 10 may further include a radiused "U"-shaped cutout 52. The cover 10 also includes one or more speaker slots 54 through which audible signals produced by the mobile phone's speaker may pass, and a microphone slot 56 through which a user's voice may be detected by the mobile phone's microphone.

The cover 10 includes an electronic data tag 100, which, as described more fully below, is used to personalize the functionalities of the mobile phone 20. As illustrated, in this example the electronic data tag 100 is disposed in the inside surface of side surface 16. More generally, the electronic data tag 100 may be disposed in or on or otherwise embedded in any portion of the cover 10, though in many cases it will be advantageous to place it at an interior location of the cover where it is unobtrusive and perhaps largely inaccessible to the user. In some implementations more than one data tag may be employed.

In one implementation the electronic data tag 100 may be a passive device, which operates without an internal battery source, deriving the power to operate from an RF field which is inductively coupled to the passive tag. The RF field can be generated by the corresponding data reader located in the mobile phone. Such passive tags are constrained in their capacity to store data and the ability to perform well in a noisy electromagnetic environment. Passive tags may contain varying amounts of information ranging from a small storage holding only an ID to 120 k byte memory sufficient to hold, for instance, a serial identification number and parity bits or a network address. Alternatively, in some implementations the data tag may be a semi-passive tag including a power supply, which can transmit and receive signals at greater distances and data rates.

A data tag reader module is installed in the mobile phone and transmits RF interrogation signals and receives responding RF signals from the data tag. The RF signals are descriptive of the contents of the tag stored in a tag memory contained in the tag.

In some implementations, Near-Field Communication (NFC) technology is used to establish communication between the data tag and the mobile phone. NFC technology involves two NFC-enabled devices brought together in close proximity to transfer information. Positioning the devices in close proximity provides an added benefit of increased security and is generally believed to be an improvement over other radio wave technology, for example. Near Field Communication (NFC) is a short-range wireless connectivity technology. NFC operates using magnetic field induction at a frequency of, for example, 13.56 MHz and transferring data at up to 424 Kbits/second. NFC provides both read and write exchange of data between electronic devices. NFC tags currently may be as small as 5×2 millimeters, with an antenna extending about 1-2 cm, and thus they may be conveniently embedded in a cover or other accessory.

NFC communication can be initiated by bringing two NFC-enabled devices (e.g., the data tag 100 and the reader module in mobile phone 20) in close proximity. Communication occurs when the devices are positioned, for example, within about four centimeters of one another. The connection can be compatible with other known wireless technologies, such as Bluetooth or Wi-Fi. NFC communication technology operates according to accepted standards, such as International Standards Organization (ISO) and/or other telecommunications standards, for example. Due to the short transmission range, NFC-enabled transactions provide increased security.

A common data format called NDEF has been defined for NFC communication. This data format can be used to store and transport different types of data, including MIME-type objects, short RTD-documents, such as URLs, and the like. Using NDEF, binary records are used which can hold different types of objects. NFC as used herein includes, but is not limited to, NFCIP-1 and NFCIP-2, which are standardized in ECMA-340 and ECMA-352, respectively.

Of course, other short-range communication technologies other than NFC may be employed to establish communication between the data tag and the mobile phone after the cover or other accessory is placed on the phone. Such short-range communication technologies may be incorporated in standards or proprietary. One example of a proprietary technology is the Sony TransferJet™, which employs a powered data tag that can store more information than an NFC tag.

In the present case the NFC reader in the mobile phone can read data stored in the NFC tag when the mobile phone is placed in the cover.

In various embodiments, the cover 10 or other accessory may include graphic (including text-based) designs (typically thematic) depicted on one or more of its exterior surfaces, and the data tag 100 may contain complementary instructions and/or data to enable the mobile phone to be personalized physically as well as behaviorally. For the present application, physical personalization refers to the outward appearance of the mobile phone, e.g. its color, graphics depicted on the exterior surfaces of the cover, and so forth. Whereas behavioral personalization refers to the customization of the functionalities of the mobile phone, e.g. modification of its ring tone, wall paper, screen savers, fonts, avatars, icons, and so forth. Behavioral personalization may also include the downloading of applications to be executed on the mobile phone and the presentation of audio and/or video segments relating to the them which are to be rendered by the mobile phone.

The designs appearing on the cover 10 may relate to one or more themes that visually convey information about that theme or themes. Themes may relate to any subject whatsoever. Common examples of such themes include, without limitation, a person (e.g., a celebrity), an organization (e.g., a sports team, a for-profit or non-profit company or other organization), a political organization (represented, for instance, by a country flag), media or other content (e.g., a television show or movie) and so on. The themes may include, for example, proprietary themes owned by multiple proprietors or their licensees.

The data tag may include data to behaviorally personalize the mobile phone in a way that is complementary to the physical theme presented on the cover. As mentioned above, such data may be used to behaviorally personalize the mobile phone by modifying its ring tone, wall paper, screen savers, fonts, avatars and/or icons and to cause theme-related audio and/or video segments to be rendered. Because the amount of information that can be stored in the data tag is limited, the data it stores is not necessarily the actual information that is needed to personalize the phone. Rather, the data may be in the form of one or more resource server specifications, which may be used to contact a resource server for additional functionalities, information and/or content. The resource specifications may be in the form of Uniform Resource Locators (URLs). In other embodiments, the data may include an identifier of the covering, and/or an approval code, both of which may be employed to facilitate access to the additional personalization functionalities and/or contents.

The process of hardware and software customization described above may be illustrated with a concrete example. In this example the theme is a celebrity singer. The celebrity singer may be any one of a number of past, present, or future famous singers, male or female, of rock n roll, country, pop, jazz, rap or classical music. Accordingly, the exterior surface of the cover is decorated with a graphic design to visually convey the celebrity singer theme. The behavioral personalization that is provided by the data tag in support of the celebrity singer theme may include wallpaper with an image of the singer and providing ring tones using audio segments extracted from audio materials, such as songs, by the singer. The personalization may further include providing video and/or pictures of the celebrity, providing audio materials, such as songs, of the celebrity, as well as providing lyrics of the songs that are provided. One or more of the provided pictures may be used as a screensaver. As previously mentioned, the data tag may store location data to retrieve all or a portion of the personalization data. The location data may be a URL identifying the data hosting server.

As another concrete example, the theme may be a celebrity sport figure. In this case the cover is decorated with a graphic design to visually convey the celebrity sport figure theme. The behavior personalization may providing video and/or pictures of the celebrity sport figure, providing a game schedule of the celebrity sport figure's team), providing statistics of the celebrity sport figure, as well as providing an application or other logic to access a current and/or past game log. One or more of the provided pictures and game schedules may be used as a screensaver. Once again, the game schedules, game log and other data may be retrieved from a remote server.

In various embodiments, the embedded data tag may also include data to provide electronic coupons that allow a user of the wireless mobile phone to obtain discounts on purchases of products or services. The items or services may be related to the personalizing theme of the cover, or related to the business of advertisers or sponsors of the cover.

Once the content facilitating the behavior personalization is downloaded to the mobile phone, it can be cached and made permanently available. The user of the mobile phone may even be able to share and distribute content to other users. In this way the content could potentially be virally distributed in a widespread manner. Alternatively, access to the content can be limited in any desired manner so that the functionality it facilitates cannot be implemented. For instance, the content could be made available for any fixed or otherwise prescribed duration of time. In another example, the content may only be available while the cover is on the mobile phone, after which it is deleted. This can be accomplished, for instance, by requiring the mobile phone to query the data tag upon start-up or boot-up in order to access the previously downloaded content. Similarly, the mobile phone may be required to query the data tag on some periodic basis in order to continue to be able to access the content. In this way a user could switch among differently themed covers and only be able to access or otherwise make use of the content facilitating behavior personalization which relates to the cover currently on the phone.

In yet other implementations the content may only be accessible a limited number of times after which it is deleted or otherwise become inaccessible or unusable.

Figure 4:
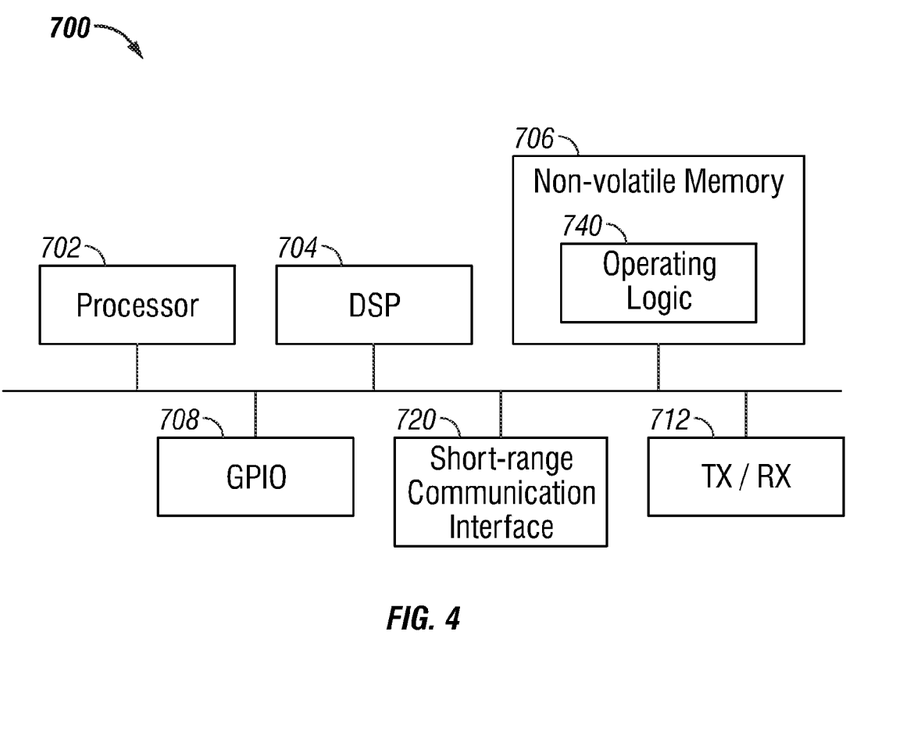
FIG. 4 is a flowchart illustrating one example of a method for personalizing a mobile communication device.

FIG. 4 shows one example of mobile communication device that is configured as a mobile phone. The mobile phone 700 includes elements such as processor 702, digital signal processor (DSP) 704, non-volatile embedded memory 706, general-purpose input/output (GPIO) interface 708, short-range communication interface 720 and transmit/receive (TX/RX) 712 coupled to each other as shown.

Non-volatile memory 706 is employed to store programming instructions and optionally, working data, including in particular, operating logic 740. Working data may include callee/messaging party or parties (e.g. their phone numbers or IP addresses) with whom a user may communicate. Working data may also include personalization data obtained from, or in accordance with the instructions in data tag 100. Processor 702, assisted by DSP 704, is employed to operate the phone and execute operating logic 740, including personalization instructions obtained from, or in accordance with the instructions in data tag 100. GPIO 708 may be employed to interface with a number of input devices, such as keypad, scroll buttons and so forth. Short-range communication interface 720 is employed to facilitate transfer of personalization data to and from data tag 100. If the data tag 100 is an NFC tag, the short-range communication interface may be an NFC reader. TX/RX 712 may be employed to transmit and receive communication signals for a call and/or a text message. TX/RX 712 may be a radio frequency transceiver, and support one or more of any of the known signaling protocols, including but not limited to CDMA, TDMA, GSM, and so forth.

Figure 5:
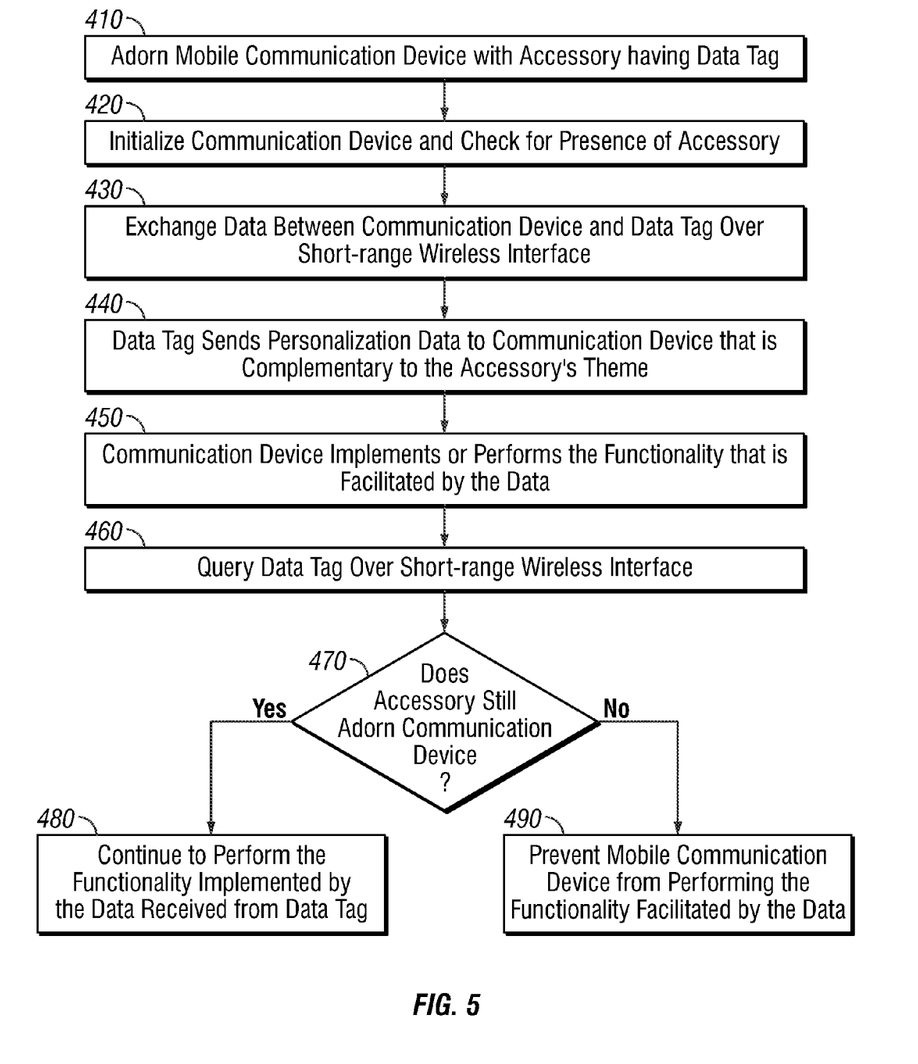
FIG. 5 is a flowchart illustrating one example of a method for personalizing a mobile communication device.

FIG. 5 is a flowchart illustrating one example of a method for personalizing a mobile communication device. The method begins in step 410 when a user of the mobile communication device (e.g., a mobile phone) adorns the device with an accessory that includes at least one exterior surface and a data tag. As previously noted, the accessory may be any item that can accessorize the device, such as a cover, sleeve, faceplate or even a sticker or the like. The accessory has an exterior with at least one graphic that conveys a theme. Next, in step 420, the communication device is initialized at e.g., power on or reset, and the operating logic 740 checks for the presence of the accessory.

Once it is determined that the mobile phone is adorned with a new cover, an exchange of data occurs in step 430 between the data tag and the communication device over the short-range wireless interface. The information that is exchanged may be certificates that are used to authenticate the two devices. In addition, in step 440 the data tag sends the personalization data that is complementary to the theme of the accessory. The data may include actual content (e.g., ringtones, wallpaper, video, applications). Alternatively, or in addition, the data may be a resource server specification that directs the communication device to a location at which the personalization data may be obtained. As previously mentioned, if the data tag is a passive tag such as a NFC tag, which can only hold a very limited amount of data, the personalization data will most likely be limited to the resource server specification (e.g., a URL). Once the communication device has received the resource server specification, it may contact the server immediately or at a later point in time. In any case, at some time after the data is received (either directly from the data tag or from the server to which the communication device is directed), in step 450 the functionality that is facilitated by the data begins to be performed or otherwise implemented.

In some implementations, some or all of the personalization, such as modification of the ring tone or wall paper, may immediately take effect as soon as they are provided to the mobile phone. In other implementations, some or all of the personalization data may be deferred by the processing logic 740 to a later point in time. For instance, the communication device may determine an appropriate "idle" opportunity, during which the personalization can be put into effect. The "idle" opportunity may be, for example, a period of time when the usage of the communication device phone is below a predetermined threshold.

Continuing with reference to FIG. 5, at some later time the processing logic 740 may query the data tag in step 460 to determine at decision step 470 if the accessory continues to adorn the mobile communication device. If it does, then the process proceeds to step 480 where the communication device continues to perform the functionality that is facilitated by the data. On the other hand, if at decision step 470 the processing logic 740 determines that the accessory no longer adorns the communication device, the processing logic proceeds to step 490 where the processing logic 740 prevents the mobile communication device from performing the functionality that is facilitated by the data.

In some implementations the data tag need not be located on an accessory that adorns the mobile phone. Rather, the data tag may be located on or near another item that includes one or more graphics that conveys a theme to an individual. By way of illustration, such an item may be a poster such as movie poster. In this case the content that facilitates personalization of the one or more functions of the mobile phone may be wirelessly transmitted when the phone is placed up near the poster. The content will be related to the theme of the item. For example, if the item is a movie poster, the content may be a screensaver showing an image from the movie or a video clip from the movie that is to be rendered by the mobile phone.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An accessory for personalizing a mobile communication device comprising:
   an accessory body that is configured to adorn the mobile communication device and at least partially cover an exterior of the mobile communication device, said accessory body having at least one exterior surface;
   at least one graphic design disposed on the exterior surface of the accessory body to convey a theme; and
   a data tag secured to the accessory, said data tag storing data that facilitates personalization of at least one functionality of the mobile communication device in support of the theme, said data tag being configured so that the data that facilitates personalization of at least one functionality of the mobile communication device in support of the theme is accessible by the mobile communication device via a short-range wireless protocol,
   wherein data that facilitates personalization of at least one functionality of the mobile communication device in support of the theme is available only when said accessory body is on the mobile communication device, and
   wherein said data tag must be queried on a periodic basis to determine if the mobile communication device may continue performing the functionality that is facilitated by the data.

2. The accessory of claim 1 wherein the short-range wireless protocol is an NFC protocol.

3. The accessory of claim 1 wherein the data tag is a passive tag that does not supply its own power.

4. The accessory of claim 1 wherein the functionality of the mobile communication device that supports the theme is selected from the group consisting of a ring tone, wallpaper and a screensaver.

5. The accessory of claim 1 wherein said data includes a network location from which content is downloadable in order to personalize the at least one functionality of the mobile communication device.

6. The accessory of claim 5 wherein the content includes visual and audio material in support of the theme.

7. The accessory of claim 5 wherein the content includes an application.

8. The accessory of claim 1 wherein the accessory body includes a faceplate, sleeve or cover that covers or encloses at least a part of the mobile communication device.

9. A method for personalizing a mobile communication device, comprising:
   determining over a short-range wireless interface if an accessory adorns a mobile communication device, said accessory including at least one exterior surface and a data tag, said exterior having at least one graphic that conveys a theme and said data tag storing data that facilitates personalization of at least one functionality of the mobile communication device in support of the theme;
   if the accessory adorns the mobile communication device, receiving the data at the mobile communication device from the data tag over a short-range wireless protocol; and performing the functionality that is facilitated by the data at a later point in time,
wherein the later point in time is determined based upon a usage level of the mobile communication device.

10. The method of claim 9 further comprising:
determining if the accessory continues to adorn the mobile communication device at a time after the data has been received; and
if it is determined that the accessory does not continue to adorn the mobile communication device, preventing the mobile communication device from performing the functionality that is facilitated by the data.

11. The method of claim 10 wherein if it is determined that the accessory continues to adorn the mobile communication device, the mobile communication device continues performing the functionality that is facilitated by the data.

12. The method of claim 9 further comprising preventing the mobile communication device from performing the functionality that is facilitated by the data after a prescribed period of time.

13. The method of claim 9 further comprising exchanging security data with the data tag to authenticate the data tag.

14. The method of claims 9 the data tag is a passive tag that does not supply its own power.

15. A computer-readable medium, not consisting of a propagated signal, comprising instructions executable by a computing system, wherein the instructions configure the computing system to perform a method for personalizing a mobile communication device, comprising:
receiving, over a short-range wireless interface, data that facilitates personalization of at least one functionality of the mobile communication device in support of a theme that is conveyed to an individual by at least one graphic included on an item that is associated with a data storage element that transmits the data to the mobile communication device over the short-range wireless interface; and
performing the functionality that is facilitated by the data on the mobile communication device, wherein said performing step is performed only during an idle period of time when the usage of the mobile communication device is below a predetermined threshold.

16. The computer-readable medium of claim 15 wherein the item is a poster.

17. The computer-readable medium of claim 15 wherein the item is a mobile phone accessory.

18. The computer-readable medium of claim 17 wherein the data is only received if the mobile phone accessory adorns the mobile phone.

19. The computer-readable medium of claim 15 wherein the data includes a coupon to receive a discount on a product or service associated with the theme.

20. The computer-readable medium of claim 15 wherein said data includes a network location from which content is downloadable in order to personalize the at least one functionality of the mobile communication device.

* * * * *